(12) United States Patent (10) Patent No.: US 9,374,870 B2
Cumpston et al. (45) Date of Patent: Jun. 21, 2016

(54) NETWORKED LIGHTING INFRASTRUCTURE FOR SENSING APPLICATIONS

(71) Applicant: Sensity Systems Inc., Sunnyvale, CA (US)

(72) Inventors: Rusty Cumpston, San Jose, CA (US); Hugh Martin, San Jose, CA (US)

(73) Assignee: Sensity Systems Inc., Sunnyvale, CA (US)

( * ) Notice: Subject to any disclaimer, the term of this patent is extended or adjusted under 35 U.S.C. 154(b) by 182 days.

(21) Appl. No.: 14/024,561

(22) Filed: Sep. 11, 2013

(65) Prior Publication Data

US 2014/0084795 A1 Mar. 27, 2014

Related U.S. Application Data

(60) Provisional application No. 61/699,968, filed on Sep. 12, 2012.

(51) Int. Cl.
*H05B 37/02* (2006.01)
*H05B 39/04* (2006.01)
*H05B 41/36* (2006.01)

(52) U.S. Cl.
CPC ............ *H05B 37/02* (2013.01); *H05B 37/0272* (2013.01); *Y10T 29/49002* (2015.01)

(58) Field of Classification Search
USPC .................................................. 315/149–159
See application file for complete search history.

(56) References Cited

U.S. PATENT DOCUMENTS

| 4,384,288 | A | 5/1983 | Walton |
| 5,161,107 | A | 11/1992 | Mayeaux et al. |
| 5,793,491 | A | 8/1998 | Wangler et al. |
| 5,842,148 | A | 11/1998 | Prendergast et al. |
| 6,118,230 | A | 9/2000 | Fleischmann |
| 6,364,253 | B1 | 4/2002 | Cavangh |
| 6,426,708 | B1 | 7/2002 | Trajkovic et al. |
| 6,608,453 | B2 | 8/2003 | Morgan et al. |
| 6,683,539 | B2 | 1/2004 | Trajkovic et al. |
| 6,696,945 | B1 | 2/2004 | Venetianer et al. |
| 6,961,313 | B1 | 11/2005 | Gaspar |

(Continued)

FOREIGN PATENT DOCUMENTS

| CA | 2690148 A | 12/2008 |
| CN | 102110376 B | 11/2012 |

(Continued)

OTHER PUBLICATIONS

J. Xu et al., "Distance Measurement Model Based on RSSI in WSN," Wireless Sensor Network, 2010, 2, 606-611.

(Continued)

*Primary Examiner* — Brandon S Cole
(74) *Attorney, Agent, or Firm* — Schwegman Lundberg & Woessner, P.A.

(57) ABSTRACT

A network using existing streetlights is described. Each street light becomes a node in the network, and each includes a power terminal for receiving electrical power, a light source coupled to the power terminal, a processor coupled to the power terminal, a network interface coupled between the processor and the network of lighting systems, and a sensor coupled to the processor for detecting a condition at the node, and in response providing information about that condition to the processor.

20 Claims, 12 Drawing Sheets

(56) References Cited

U.S. PATENT DOCUMENTS

| | | |
|---|---|---|
| 6,970,083 B2 | 11/2005 | Venetianer et al. |
| 6,999,882 B2 | 2/2006 | Frie et al. |
| 7,304,727 B2 | 12/2007 | Chien et al. |
| 7,333,903 B2 | 2/2008 | Walters et al. |
| 7,583,815 B2 | 9/2009 | Zhang et al. |
| 7,613,324 B2 | 11/2009 | Venetianer et al. |
| 7,613,590 B2 | 11/2009 | Brown |
| 7,674,018 B2 | 3/2010 | Holder et al. |
| 7,817,063 B2 | 10/2010 | Hawkins et al. |
| 7,825,602 B2 | 11/2010 | Hu et al. |
| 7,868,912 B2 | 1/2011 | Venetianer et al. |
| 7,925,249 B2 | 4/2011 | Funk et al. |
| 7,925,384 B2 | 4/2011 | Huizenga et al. |
| 7,932,923 B2 | 4/2011 | Lipton et al. |
| 7,983,685 B2 | 7/2011 | Silverstrim et al. |
| 7,986,339 B2 | 7/2011 | Higgins |
| 8,027,809 B2 | 9/2011 | Brown |
| 8,049,592 B2 | 11/2011 | Wang et al. |
| 8,073,554 B2 | 12/2011 | Vezza et al. |
| 8,078,431 B2 | 12/2011 | Brown |
| 8,095,340 B2 | 1/2012 | Brown |
| 8,111,018 B2 | 2/2012 | You |
| 8,147,267 B2 | 4/2012 | Oster |
| 8,244,260 B2 | 8/2012 | Silverstrim et al. |
| 8,285,986 B2 | 10/2012 | Shon et al. |
| 8,306,051 B2 | 11/2012 | Stocker |
| 8,334,901 B1 | 12/2012 | Ganick et al. |
| 8,334,906 B2 | 12/2012 | Lipton et al. |
| 8,436,542 B2 | 5/2013 | Middleton-White et al. |
| 8,438,175 B2 | 5/2013 | Papke et al. |
| 8,441,397 B2 | 5/2013 | Binzer et al. |
| 8,461,963 B2 | 6/2013 | Ko et al. |
| 8,464,182 B2 | 6/2013 | Blumenberg et al. |
| 8,493,209 B2 | 7/2013 | Mohan et al. |
| 8,510,550 B2 | 8/2013 | Westhoff et al. |
| 8,514,082 B2 | 8/2013 | Cova et al. |
| 8,522,029 B2 | 8/2013 | Agrawal et al. |
| 8,531,134 B2 | 9/2013 | Chemel et al. |
| 8,532,962 B2 | 9/2013 | Zhang et al. |
| 8,533,491 B2 | 9/2013 | Klein |
| 8,542,130 B2 | 9/2013 | Lavoie |
| 8,558,889 B2 | 10/2013 | Martin et al. |
| 8,560,357 B2 | 10/2013 | Sickenius |
| 8,564,661 B2 | 10/2013 | Lipton et al. |
| 8,575,861 B1 | 11/2013 | Gordin et al. |
| 8,582,816 B2 | 11/2013 | Lee et al. |
| 8,587,225 B2 | 11/2013 | Ashar et al. |
| 8,590,011 B1 | 11/2013 | Legault et al. |
| 8,594,482 B2 | 11/2013 | Fan et al. |
| 8,607,341 B2 | 12/2013 | Yoon et al. |
| 8,619,079 B2 | 12/2013 | Peterson et al. |
| 8,619,549 B2 | 12/2013 | Narayana et al. |
| 8,635,049 B2 | 1/2014 | Kauffman et al. |
| 8,732,031 B2 | 5/2014 | Martin et al. |
| 8,880,199 B2* | 11/2014 | Wei et al. ........................ 700/11 |
| 8,994,276 B2* | 3/2015 | Recker et al. .................. 315/160 |
| 2002/0195975 A1* | 12/2002 | Schanberger et al. ........ 315/291 |
| 2003/0102979 A1 | 6/2003 | Jednacz et al. |
| 2003/0222587 A1 | 12/2003 | Dowling et al. |
| 2004/0124338 A1 | 7/2004 | Cloutier et al. |
| 2005/0285547 A1* | 12/2005 | Piepgras et al. .............. 315/294 |
| 2007/0050240 A1 | 3/2007 | Belani et al. |
| 2007/0234036 A1 | 10/2007 | Tan et al. |
| 2007/0258585 A1 | 11/2007 | Sandhu et al. |
| 2007/0294393 A1 | 12/2007 | Smith et al. |
| 2008/0215391 A1* | 9/2008 | Dowling et al. ................... 705/7 |
| 2009/0026966 A1 | 1/2009 | Budde et al. |
| 2009/0066540 A1 | 3/2009 | Marinakis et al. |
| 2009/0218951 A1* | 9/2009 | Weaver ........................ 315/154 |
| 2009/0262189 A1 | 10/2009 | Marman |
| 2009/0278479 A1 | 11/2009 | Platner et al. |
| 2009/0299527 A1 | 12/2009 | Huizenga et al. |
| 2009/0307255 A1 | 12/2009 | Park |
| 2010/0001652 A1* | 1/2010 | Damsleth ....................... 315/149 |
| 2010/0204847 A1 | 8/2010 | Leete, III et al. |
| 2010/0228601 A1 | 9/2010 | Vaswani et al. |
| 2011/0002324 A1 | 1/2011 | Falck et al. |
| 2011/0066297 A1* | 3/2011 | Saberi et al. .................. 700/287 |
| 2011/0133655 A1* | 6/2011 | Recker et al. ................. 315/159 |
| 2011/0158410 A1 | 6/2011 | Falk et al. |
| 2011/0199004 A1* | 8/2011 | Henig et al. .................. 315/152 |
| 2011/0309756 A1* | 12/2011 | Chao ............................ 315/158 |
| 2012/0002406 A1 | 1/2012 | Leadford et al. |
| 2012/0008787 A1 | 1/2012 | Wan et al. |
| 2012/0036362 A1 | 2/2012 | Agrawal et al. |
| 2012/0038281 A1 | 2/2012 | Verfuerth |
| 2012/0040606 A1 | 2/2012 | Verfuerth |
| 2012/0043889 A1* | 2/2012 | Recker et al. .................... 315/86 |
| 2012/0062123 A1 | 3/2012 | Jarrell et al. |
| 2012/0068608 A1 | 3/2012 | Covaro et al. |
| 2012/0086561 A1 | 4/2012 | Ilyes et al. |
| 2012/0130544 A1 | 5/2012 | Mohan et al. |
| 2012/0130774 A1 | 5/2012 | Ziv et al. |
| 2012/0143357 A1 | 6/2012 | Chemel et al. |
| 2012/0146518 A1 | 6/2012 | Keating et al. |
| 2012/0191770 A1 | 7/2012 | Perlmutter et al. |
| 2012/0262093 A1 | 10/2012 | Recker et al. |
| 2012/0310984 A1 | 12/2012 | Branson et al. |
| 2012/0321086 A1 | 12/2012 | D'souza et al. |
| 2013/0010251 A1 | 1/2013 | Croft et al. |
| 2013/0013091 A1 | 1/2013 | Cavalcanti et al. |
| 2013/0073192 A1 | 3/2013 | Hota et al. |
| 2013/0088168 A1 | 4/2013 | Mohan et al. |
| 2013/0107041 A1 | 5/2013 | Norem et al. |
| 2013/0134886 A1 | 5/2013 | Golding et al. |
| 2013/0144564 A1 | 6/2013 | Devaul et al. |
| 2013/0158952 A1 | 6/2013 | Liebel et al. |
| 2013/0159454 A1 | 6/2013 | Hunter et al. |
| 2013/0211613 A1 | 8/2013 | Praske et al. |
| 2013/0221203 A1 | 8/2013 | Barrilleaux |
| 2013/0227569 A1 | 8/2013 | Kohli et al. |
| 2013/0229804 A1 | 9/2013 | Holder et al. |
| 2013/0258107 A1 | 10/2013 | Delibaltov et al. |
| 2013/0265563 A1 | 10/2013 | Vogt et al. |
| 2013/0285855 A1 | 10/2013 | Dupray et al. |
| 2013/0297212 A1 | 11/2013 | Ramer et al. |
| 2013/0342355 A1 | 12/2013 | Lund et al. |
| 2013/0346229 A1* | 12/2013 | Martin et al. ................ 705/26.3 |
| 2014/0028199 A1* | 1/2014 | Chemel ........................ 315/152 |
| 2014/0084795 A1* | 3/2014 | Cumpston et al. ............ 315/149 |
| 2015/0254463 A1 | 9/2015 | Ryhorchuk et al. |
| 2015/0254570 A1 | 9/2015 | Florence et al. |
| 2015/0256623 A1 | 9/2015 | Ryhorchuk et al. |

FOREIGN PATENT DOCUMENTS

| | | |
|---|---|---|
| CN | 102867386 A | 1/2013 |
| CN | 20293979 U | 5/2013 |
| CN | 103687200 A | 3/2014 |
| EP | 1658579 A1 | 5/2006 |
| EP | 2581888 A1 | 4/2013 |
| EP | 2660625 A1 | 11/2013 |
| EP | 2709428 A2 | 3/2014 |
| JP | 2014064274 A | 4/2014 |
| KR | 10-2007-0044243 A | 4/2007 |
| KR | 10-0760535 B1 | 9/2007 |
| KR | 10-0784836 B1 | 12/2007 |
| KR | 2010-0136186 | 12/2010 |
| KR | 2011-0017037 | 2/2011 |
| KR | 2011-0055807 A | 5/2011 |
| WO | WO03055734 A1 | 7/2003 |
| WO | WO2008008505 A2 | 1/2008 |
| WO | WO2008085815 A1 | 7/2008 |
| WO | WO2009076182 A1 | 6/2009 |
| WO | WO2011041903 A1 | 4/2011 |
| WO | WO2011053969 A2 | 5/2011 |
| WO | WO-2011055261 A1 | 5/2011 |
| WO | WO2011121470 A1 | 10/2011 |
| WO | WO2011132013 A1 | 10/2011 |
| WO | WO2012042432 A1 | 4/2012 |
| WO | WO2012092150 A2 | 7/2012 |
| WO | WO2012140152 A1 | 10/2012 |
| WO | WO2013131189 A1 | 9/2013 |
| WO | WO2013165777 A1 | 11/2013 |

(56) References Cited

FOREIGN PATENT DOCUMENTS

| WO | WO-2015134879 A1 | 9/2015 |
| WO | WO-2015134929 A2 | 9/2015 |
| WO | WO-2015134929 A3 | 9/2015 |
| WO | WO-2015134937 A1 | 9/2015 |

OTHER PUBLICATIONS

D. Munoz et al., "Position Location Techniques and Applications," Academic Press, 2009.

International Search Report, International Application No. PCT/US2013/045407, dated Sep. 23, 2013.

International Search Report, International Application No. PCT/US2013/037968, dated Jul. 2, 2013.

Korean Intellectual Property Office, Korean Application No. 10-2013-0109844, Office Action issued Jul. 24, 2014.

International Search Report, International Application No. PCT/US2014/031723, dated Jul. 7, 2014.

U.S. Appl. No. 14/224,300, filed Mar. 25, 2014, Non-Final Office Action, issued Jul. 8, 2014.

"International Application Serial No. PCT/US2015/019195, International Search Report mailed Jun. 16, 2015", 3 pgs.

"International Application Serial No. PCT/US2015/019195, Written Opinion mailed Jun. 16, 2015", 8 pgs.

"International Application Serial No. PCT/US2015/019286, International Search Report mailed Jun. 11, 2015", 2 pgs.

"International Application Serial No. PCT/US2015/019286, Written Opinion mailed Jun. 11, 2015", 8 pgs.

"International Application Serial No. PCT/US2015/019296, International Search Report mailed Jun. 1, 2015", 3 pgs.

"International Application Serial No. PCT/US2015/019296, Written Opinion mailed Jun. 1, 2015", 8 pgs.

"Korean Application Serial No. 2013-109844, Final Rejection After Reexamination mailed Apr. 14, 2015", W/ English Translation, 6 pgs.

"Korean Application Serial No. 2013109844, Office Action mailed Feb. 26, 2015", 6 pgs.

European Application Serial No. 13184124.9, Communication Pursuant to EPC Rule 69 mailed Jul. 13. 2015, 2 pgs.

European Application Serial No. 13184124.9, Extended European Search Report mailed Jun. 5, 2015, 9 pgs.

European Application Serial No. 13184124.9, Response filed Jan. 8, 2016 to Extended European Search Report mailed Jun. 5, 2015, 22 pgs.

Korean Application Serial No. 2013-0109844, Response filed Oct. 14, 2014 to Office Action mailed Jul. 24, 2014, W/ English Claims.

Korean Application Serial No. 2013109844, Response filed Mar. 30, 2015 to Office Action mailed Feb. 26, 2015, W/ English Claims, 20 pgs.

* cited by examiner

NETWORKED LIGHTING INFRASTRUCTURE FOR SENSING APPLICATIONS

REFERENCE TO RELATED APPLICATION

This patent application claims priority from U.S. Provisional Patent Application Ser. No. 61/699,968, filed Sep. 12, 2012, and entitled "Networked Lighting Infrastructure for Sensing Applications," the contents of which are incorporated by reference herein.

BACKGROUND OF THE INVENTION

This invention relates to the use of street or other lighting systems as a basis for a network of sensors, platforms, controllers and software enabling functionality beyond lighting of outdoor or indoor spaces.

Industrialized countries throughout the world have extensive networks of indoor and outdoor lighting. Streets, highways, parking lots, factories, office buildings, and all types of facilities often have extensive indoor and outdoor lighting. Substantially all of this lighting until recently uses incandescent or high intensity discharge (HID) technology. Incandescent or HID lighting, however, is inefficient in conversion of electrical power to light output. A substantial fraction of the electrical power used for incandescent lighting is dissipated as heat. This not only wastes energy, but also often causes failure of the light bulbs themselves, as well as of the lighting apparatus.

As a result of these disadvantages, and the operating and maintenance cost efficiencies of light emitting diodes or other solid-state lighting technologies, many owners of large numbers of incandescent or HID light fixtures are converting them to use solid-state lighting. Solid-state lighting not only provides for longer life bulbs, thereby reducing labor costs for replacement, but the resulting fixtures also operate at low temperatures for longer periods, further reducing the need to maintain the fixtures. The assignee of this application provides lighting replacement services and devices to various municipalities, commercial and private owners, enabling them to operate their facilities with reduced maintenance costs and reduced energy costs.

BRIEF SUMMARY OF THE INVENTION

We have developed a networked sensor and application framework for deployment in street or other lighting systems. The architecture of our system allows deployment of a networked system within the lighting infrastructure already in place, or at the time of its initial installation. While the system is typically most advantageously deployed in outdoor street lighting, it also can be deployed indoors, for example, in a factory or office building. Also advantageously, when the system is deployed outdoors, it can be installed at a time when street lamp bulbs are changed from incandescent lighting to more efficient lighting, for example, using light emitting diodes (LEDs). The cost of replacing such incandescent bulbs is high, primarily due to the cost of labor and the necessity to use special equipment to reach each bulb in each street lamp. By installing the network described here at that time, the incremental cost vis-à-vis merely replacing the existing incandescent bulb with an LED bulb is minimal.

Because our system enables numerous different uses, we refer to the deployed network, sensors, controller and software system described here as a Lighting Infrastructure Application Framework (LIAF). The system uses lighting infrastructure as a platform for business and consumer applications implemented using a combination of hardware and software. The main components of the framework are the node hardware and software, sensor hardware, site specific or cloud based server hardware, network hardware and software and wide-area network resources that enable data collection, analysis, action invocation and communication with applications and users. Although the system is described here in the context of street lighting, it will be evident from the following description that the system has applicability to other environments, for example, in a parking garage or factory environment.

In a preferred embodiment, our system provides for a network of lighting systems using existing outdoor, parking structure and indoor industrial lights. Each light can become a node in the network, and each node includes a power control terminal for receiving electrical power, a light source coupled to the power control terminal, a processor coupled to the power control terminal, a network interface coupled between the processor and the network of lighting systems, and sensors coupled to the processor for detecting a conditions at the node. In some applications as described below, the network does not rely on a lighting system. In combination our system allows each node to convey information to other nodes and to central locations about the conditions at the nodes. Processing can therefore be distributed among the nodes in the LIAF.

We use a gateway coupled to the network interface of some LIAF nodes for providing information from the sensors at the nodes to a local or cloud based service platform where application software stores, processes, distributes and displays information. This software performs desired operations related to the conditions detected by the sensors at the nodes. In addition, the gateway can receive information from the service platform and provide that information to the each of the node platforms in its domain. That information can be used to facilitate maintenance of the light, control of the light, control cameras, locate unoccupied parking spaces, measure carbon monoxide levels or numerous other applications, several typical ones of which are described herein. The sensors collocated or in the proximity of the nodes can be used with controllers to control the light source, as well as to provide control signals to apparatus coupled to the node, e.g. lock or unlock a parking area. Multiple gateways can be used to couple multiple regions of the lighting system together for purposes of a single application.

Typically each node will include AC/DC converters to convert the supplied AC power to DC for use by the processor, sensors, etc. The gateways can communicate with each other through cellular, Wi-Fi or other means to the service platforms. The sensors are typically devices which detect particular conditions, for example, audio from glass breaking or car alarms, video cameras for security and parking related sensing, motion sensors, light sensors, radio frequency identification detectors, weather sensors or detectors for other conditions.

In another embodiment we provide a network of sensors for collecting information by using existing lighting systems having fixtures with light sources. The method includes replacing the light source at each fixture with a module that includes a power control terminal connected to the power supply of the existing light fixture, a replacement light source, a processor, a network interface coupled to the processor, and sensors coupled to the processor. The sensors detect conditions at and around the node, and forward information about that condition to the processor. Preferably, the network interface of each module at each fixture is commonly coupled together using a broadband or cellular communications network. Using the communication network, information is collected from the sensors, and that information is provided over the network to application running on local servers at a site or servers in the cloud. A local or site based application server is referred to as Site Controller. Applications running on a Site Controller can manage data from one or more specific customer sites.

In a preferred embodiment, each module at each of the fixtures includes a controller and apparatus coupled to the controller, and the controller is used to cause actions to be performed by the apparatus. As mentioned above, signals can be transmitted from the computing device over the communication network to the modules and thereby to the controllers to cause an action to be performed by the apparatus of the lighting system.

DETAILED DESCRIPTION OF THE INVENTION

The Lighting Infrastructure Application Framework described here is based on node, gateway and service architectures. The node architecture consists of a node platform which is deployed at various locations in the lighting infrastructure, e.g. at individual street light fixtures. At least some of the nodes include sensors that collect and report data to other nodes, and in some cases to higher levels in the architecture. For example, at the level of an individual node an ambient light sensor can provide information about lighting conditions at the location of the lighting fixture. A camera can provide information about events occurring at the node.

Figure 1:
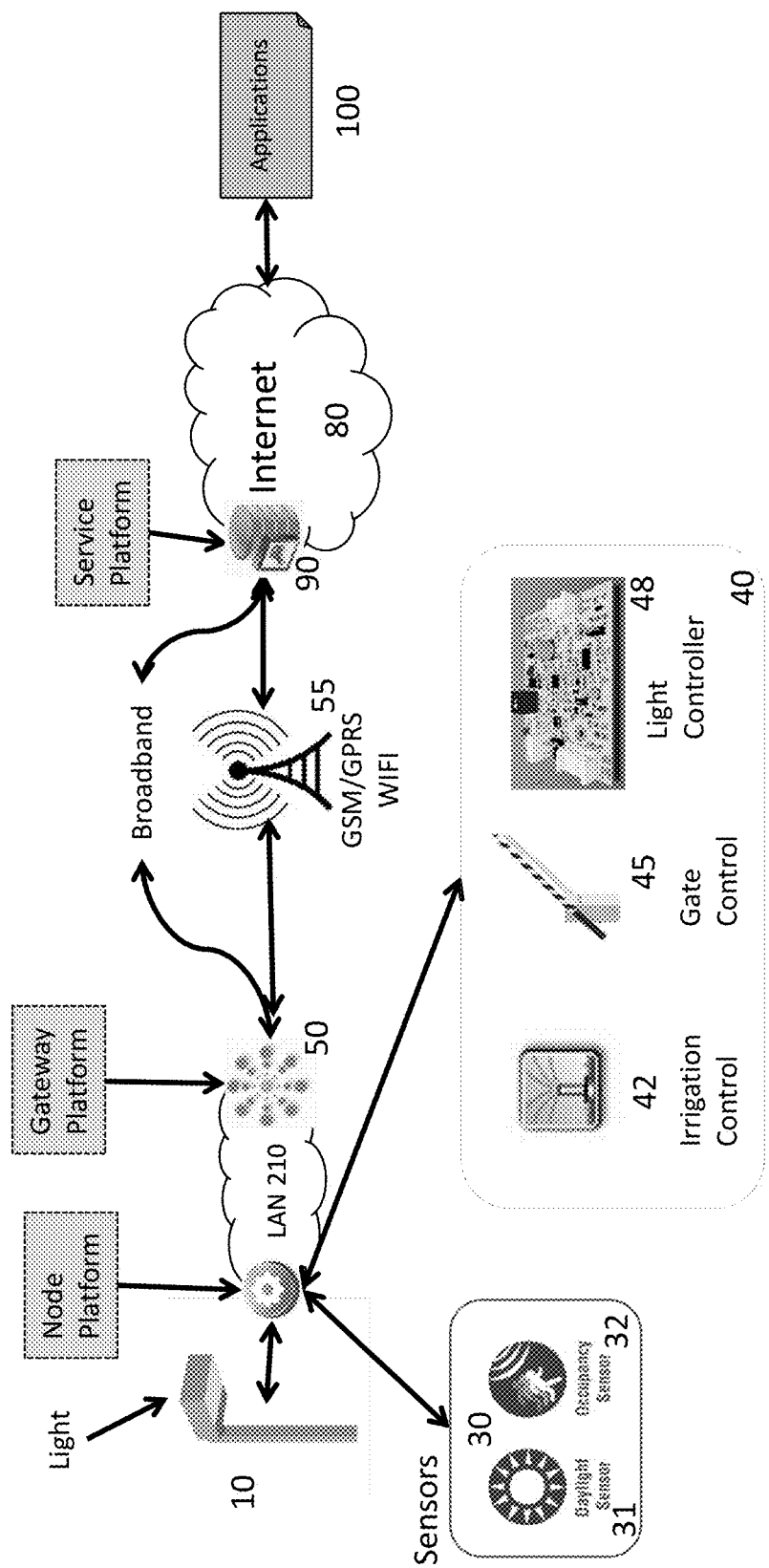
FIG. 1 illustrates a portion of the overall architecture of a Lighting Infrastructure Application Framework.

FIG. 1 illustrates a portion of the overall architecture of our system. As shown there a lighting node 10 includes a node platform in addition to the light source itself. The node platform includes sensors 30 of various types as selected by the owner of the lighting node 10, depending upon the particular application desired. In the illustration, a daylight sensor 31 and an occupancy sensor 32 are depicted. The lighting node may also include controllers 40 for performing functions in response to the sensors 30, or performing functions in response to control signals received from other sources. Three exemplary controllers are illustrated in the diagram, namely an irrigation control 42 for controlling an irrigation system, a gate control 45 for opening and closing a nearby gate, and a light controller 48. The light controller can be used to control the lighting source in node 10, for example, turning it off or on at different times of the day, dimming it, causing it to flash, sensing the condition of the light source itself to determine if maintenance is required, or providing other functionality. The sensors 30, controllers 40 power supply, and other desired components can be collectively assembled into a housing of the lighting fixture 10.

Other examples of control functions which these or similar controllers enable include: management of power distribution, measurement and monitoring of power, and demand/response management. The controllers can activate and deactivate sensors, and can measure and monitor the sensor outputs. In addition, the controllers provide management for communication functions such as gateway operation for software downloading and security administration, and for video and audio processing, for example detection or monitoring of events.

In the preferred embodiment the architecture of our networked system enables "plug-and-play" deployment of sensors at the lighting nodes. The Lighting Infrastructure Application Framework (LIAF) provides hardware and software to enable implementation of the sensor plug-and-play architecture. When new sensors are deployed, software and hardware manages the sensor, but the LIAF provides support for generic functions associated with the sensors. This can reduce or eliminate the need for custom hardware and software support for sensors. A sensor requires power, typically battery or wired low voltage DC, and preferably the sensor generates analog or digital signals as output.

The LIAF allows deployment of sensors at lighting nodes without additional hardware and software components. In a preferred implementation, the LIAF provides DC Power to sensor as required. It also monitors the analog or digital interface associated with the sensor, as well as all other activities at the node.

The node platforms located at some of the lights are coupled together to a gateway platform 50. The gateway platform 50 communicates with the node platform using technology as described further below, but can include a wireless connection or a wired connection. The gateway 50 will preferably communicate with the Internet 80 using well-known communications technology 55 such as cellular data, Wi-Fi, GPRS, or other means. Of course, the gateway platform 50 does not need to be a stand-alone implementation. It can be deployed at a lighting node 10. The gateway platform provides wide area networking (WAN) functionality and can provide complex data processing functionality, in addition to the functions provided by the node platform.

The gateway platform 50 establishes communications with a Service Platform 90 enabling the node to provide data to, or receive instructions from, various applications 100. Service Platform 90 is preferably implemented in the cloud to enable interaction with applications 100. When a Service Platform 90 or a subset of the functionality is implemented locally at a site then it is referred to as Site Controller. Associated with the service platform are a variety of applications that offer end-user accessible functions. Owners, partners, consumers, or other entities can provide these applications. One typical application, for example, provides reports on current weather conditions at a node. The applications 100 are usually developed by others and licensed to the infrastructure owner, but they can also be provided by the node owner, or otherwise made available for use on various nodes.

Typical lighting related applications include lighting control, lighting maintenance, and energy management. These applications preferably run on the Service Platform 90 or Site Controller. There also can be partner applications—applications that have access to confidential data and to which the lighting infrastructure owners grant privileges. Such applications can provide security management, parking management, traffic reporting, environment reporting, asset management, logistics management, and retail data management to name a few. There are also consumer applications that enable consumers to have access to generic data, with access to this data granted, for example, by the infrastructure owner. Another type of application is owner-provided applications. These are applications developed and used by infrastructure owners, e.g. controlling traffic flow in a region or along a municipal street. Of course there can also be applications that use customized data from the framework.

The primary entities involved in the system illustrated in FIG. 1 are a lighting infrastructure owner, an application framework provider, an application or application service owner, and end users. Typical infrastructure owners include a municipality; a building owner, tenants, an electric utility, or other entities.

Figure 2:
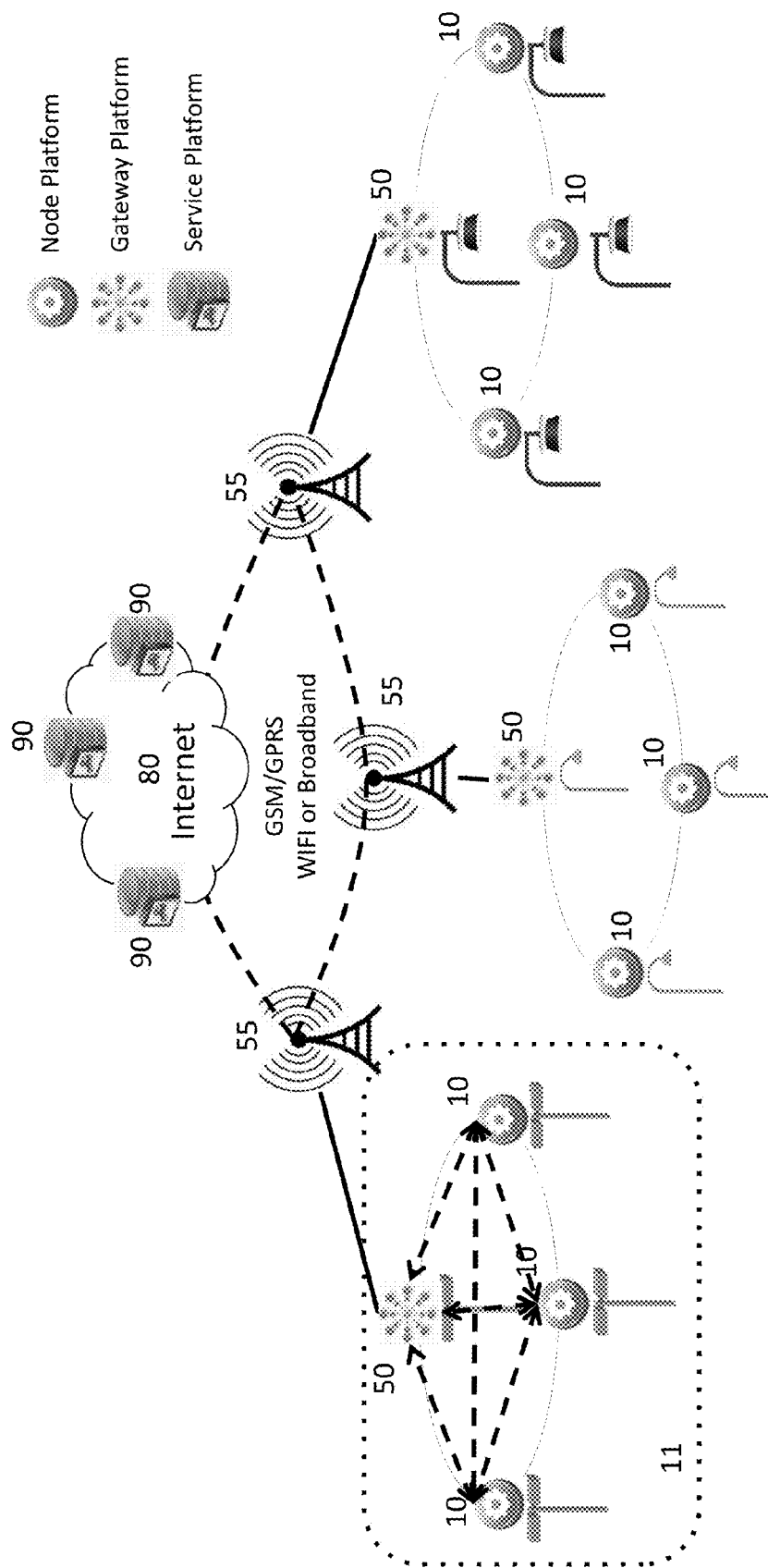
FIG. 2 illustrates the architecture of the system at a higher level.

FIG. 2 is a diagram that illustrates the architecture of our system at a higher level. As shown in FIG. 2 groups of nodes 10 communicate with each other and to a gateway platform 50. The gateway communicates, in turn, through communication media 55 to the Internet 80. In a typical implementation as illustrated, there will be multiple sets of nodes 10, multiple gateways 50, multiple communication media 55, all commonly coupled together to the service platforms 90 available through the Internet 80. In this manner, multiple applications can provide a wide degree of functionality to individual nodes through the gateways in the system.

FIG. 2 also illustrates the networking architecture for an array of nodes. In the left-hand section 11 of the drawing an array of nodes 10 are illustrated. Solid lines among the nodes represent a data plane, which connects selected nodes to enable high local bandwidth traffic. These connections, for example, can enable the exchange of local video or data among these nodes. The dashed lines in section 11 represent a control plane, which connects all of the nodes to each other and provides transport for local and remote traffic, exchanging information about events, usage, node status, and enabling control commands from the gateway, and responses to the gateway, to be implemented.

Figure 3:
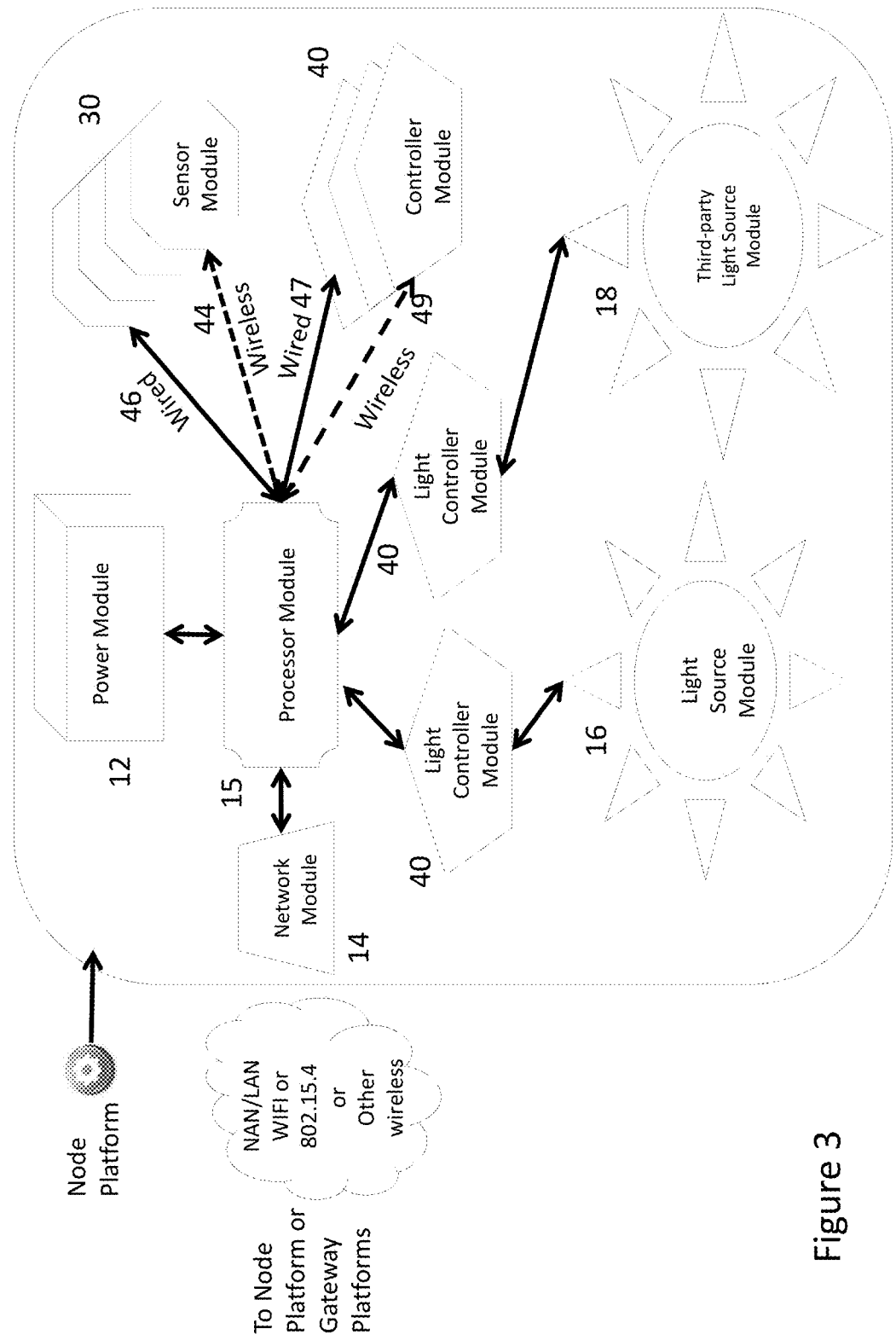
FIG. 3 is a block diagram of the node platform.

FIG. 3 illustrates the node platform in more detail. The node infrastructure includes a power supply 12, typically implemented as an AC to DC converter. In the preferred implementation where the nodes are deployed at outdoor street lamps, AC power is the primary power supply to such street lamps. Because most of the sensors and controller structures use semiconductor-based components, power supply 12 converts the available AC power to an appropriate DC power level for driving the node components.

As also shown in FIG. 3, the array of sensors 30 and controllers 40 are connected to the power module 12 which can include an AC/DC converter as well as other well-known components. A processor running an application 15 coordinates operation of the sensors and controllers to implement the desired local functionality. It also provides communication via appropriate media to other node platforms. The application may also drive an LED driver circuit 16, coupled to an appropriate light source 18, operating under control of one of the controllers 40. An implementation might combine the power module 12 and the Light Controller Module 40 functionality into a single module. As indicated by the diagram, wired 46 and 47 connections and wireless 44 and 49 connections may be provided as desired.

In FIG. 3, the lighting infrastructure consists of a Light Source Module 16, 18, e.g. an LED assembly such as those commercially available from the assignee Sensity Systems Inc. Of course, third-party manufacturers can provide the Third-party Light Source Module 18 as well as other components. The module 16 may also be coupled to a controller 40. The sensors 30 associated with the nodes may be local to the node, or they can be remote. Controllers, other than the LED controller provided by the assignee Sensity Systems Inc., are typically remote and use wireless communications. A Processor Module 15, also referred to as a Node Application Controller, manages all the functions within the node. It also implements the administrative, data collection and action instructions associated with applications. Typically these instructions are delivered as application scripts to the controller. In addition, the software on the application controller provides activation, administration, security (authentication and access control) and communication functions. The Network Module 14 provides Radio Frequency (RF) based wireless communications to the other nodes. These wireless communications can be based on Neighborhood Area Network (NAN), WiFi, 802.15.4 or other technologies.

Figure 4:
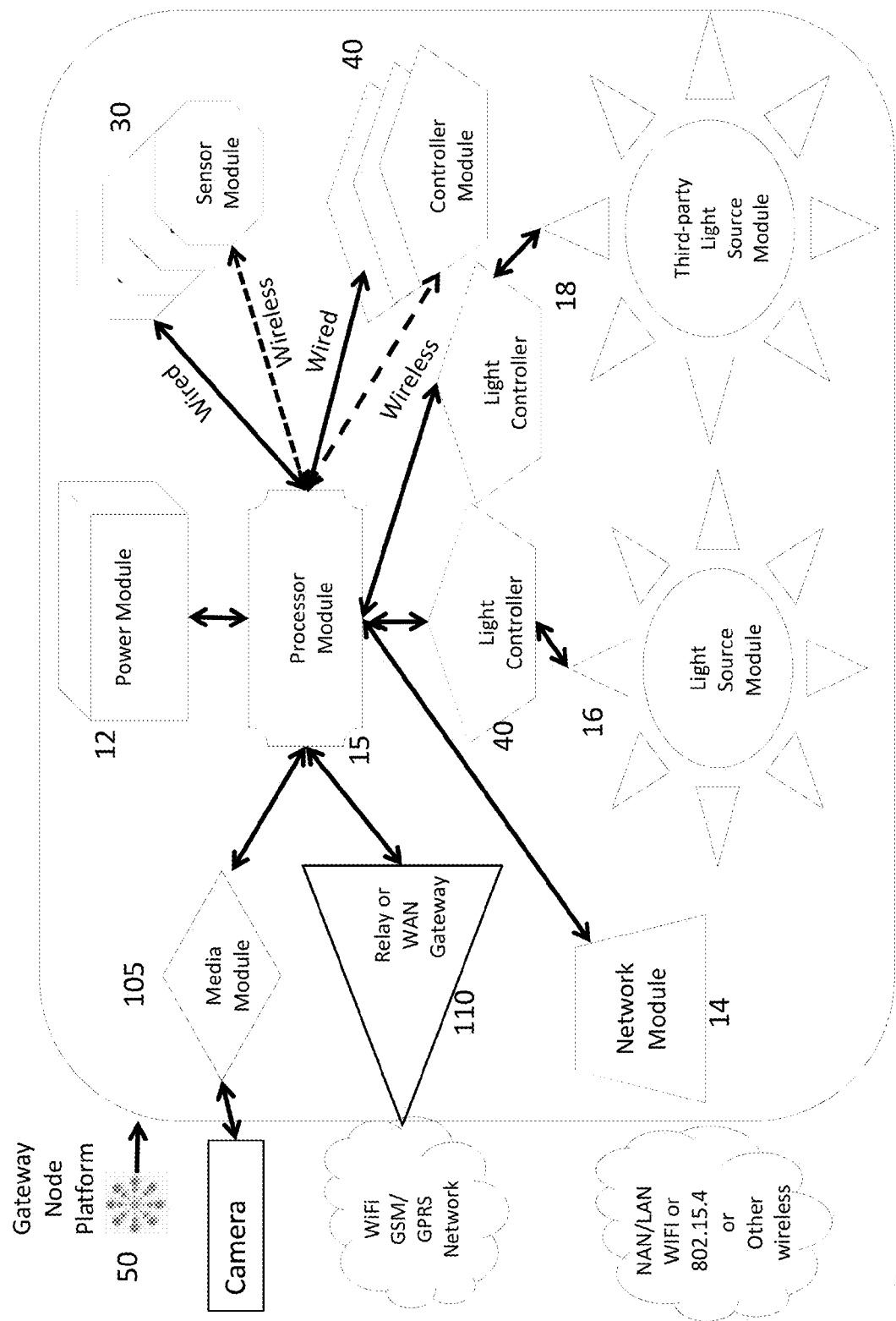
FIG. 4 is a block diagram of the gateway platform.

FIG. 4 is a block diagram of gateway platform 50. As suggested by the figure, and mentioned above, the gateway platform can be located at a node or located in its own housing separately from the nodes. In the diagram of FIG. 4, the components of the power module 12, Processor Module 15, LED Light Source Module 16 and Third-party Light Source Module 18 are shown again, as well as the Sensor Modules 30 and Controller Modules 40.

The gateway platform hardware and software components enable high bandwidth data processing and analytics using Media Module 105, e.g. at video rates, as well as Relay or WAN Gateway 110, in addition to the functions supported by the node platform. The gateway platform can be considered a node platform but with additional functionality. The high bandwidth data processing Media Module 105 supports video and audio data processing functions that can analyze, detect, record and report application specific events. The Relay or WAN Gateway 110 can be based on GSM, Wi-Fi, LAN to Internet, or other wide area networking technologies.

Figure 5:
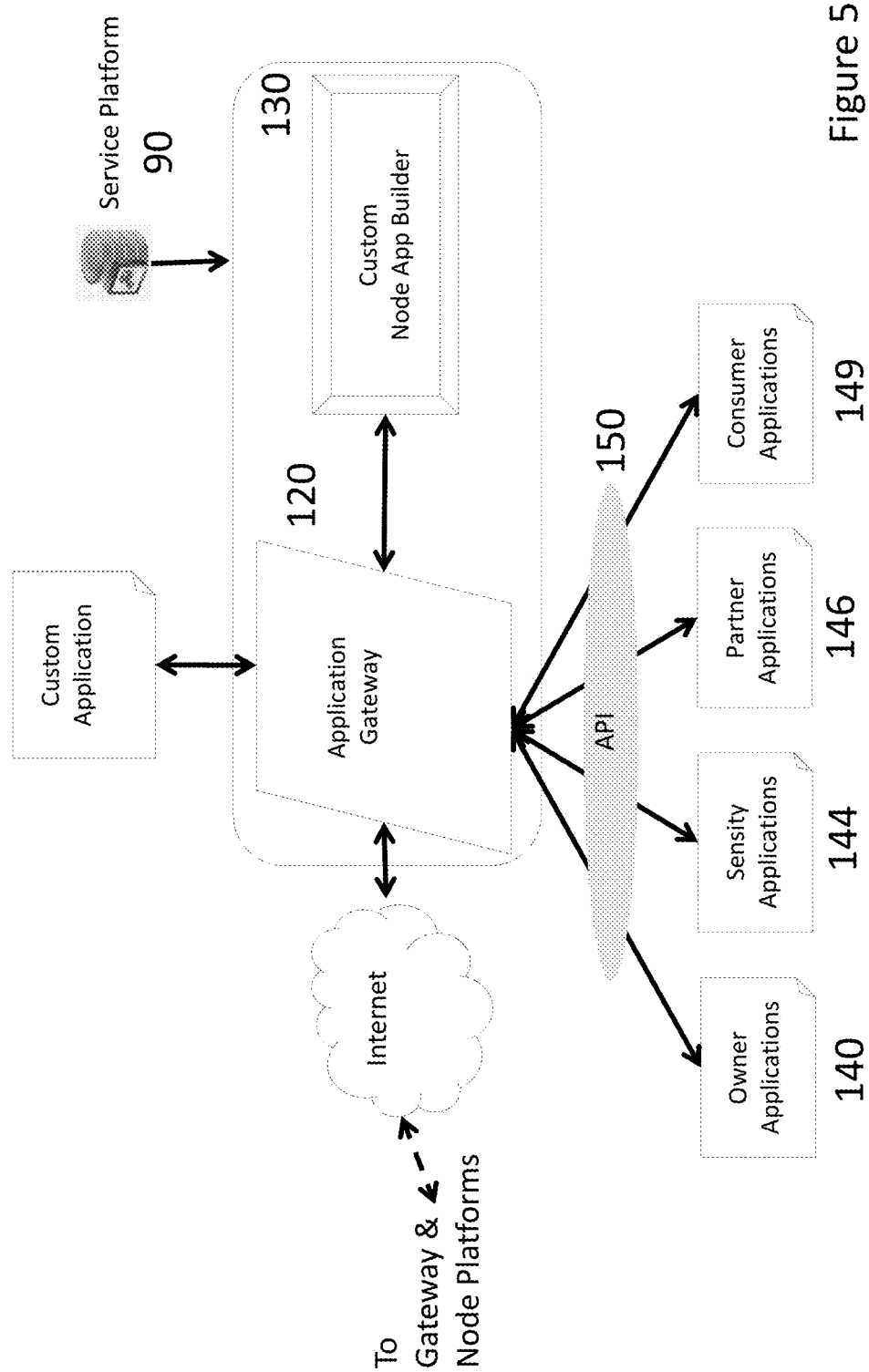
FIG. 5 is a block diagram of the service platform.

FIG. 5 is a block diagram of the service platform 90. The service platform 90 supports the application gateway 120 and a custom node application builder 130. The application gateway 120 manages interfaces to different types of applications implemented using the sensor and event data from the lighting nodes. A service platform 90 with Application Gateway 120 can be deployed as Site Controller at customer lighting site. A Site Controller therefore is an instance of Service Platform 90 with just the Application Gateway 120 functionality. The custom node application builder 130 allows development of custom node application scripts. These scripts specify to the node Processor Module 15 (see FIG. 3), data collection instructions and operations to be performed at the node level. The scripts specify to the application gateway 120 how the results associated with the script are provided to an application.

FIG. 5 also illustrates that owner applications 140, assignee applications 144, partner applications 146, and consumer applications 149 utilize the application gateway API 150. The assignee hereto has developed and implements various types of applications common to many uses of the sensors. One such application is lighting management. The lighting management application provides lighting status and control functionality for the light source at a local node 10. Another application provided by the assignee provides for lighting maintenance. The lighting maintenance application allows users to maintain their lighting network, for example, by enabling monitoring the status of the light(s) at each node. An energy management application allows users to monitor lighting infrastructure energy usage and therefore to better control that use.

The partner applications 146 shown in FIG. 5 are typically assignee-approved applications and application services companies that have established markets for various desired functions, such as those listed below. These applications utilize the application gateway API 150. Typical partner applications provide security management, parking management, traffic monitoring and reporting, environment reporting, asset management, and logistics management.

Consumer applications 149 utilize application gateway API 150 to provide consumer related functionality. This API provides access to publicly available, anonymous and owner-approved data. Also shown are owner applications 140 developed and used by lighting infrastructure owners to meet their various specific needs.

Figure 6:
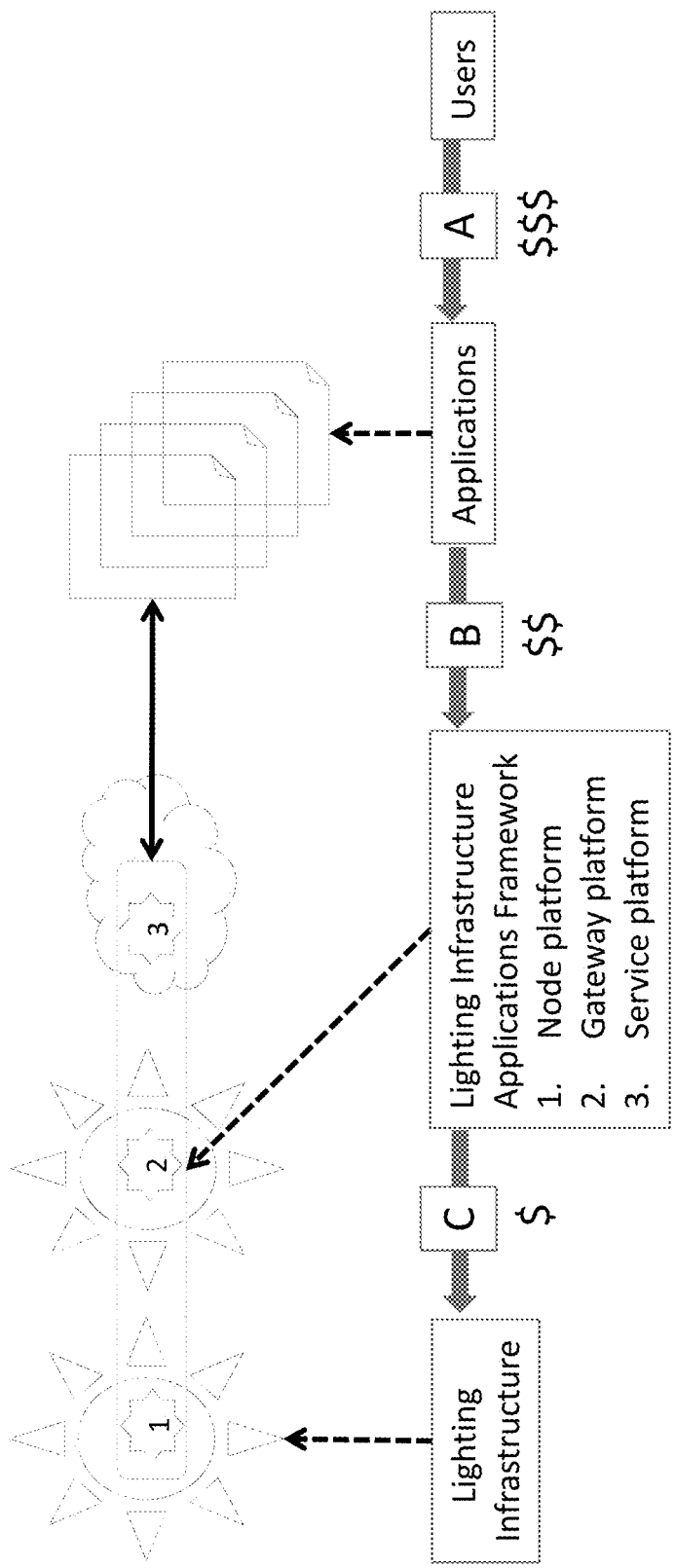
FIG. 6 is a diagram illustrating a revenue model for lighting infrastructure applications.

FIG. 6 illustrates the lighting infrastructure applications revenue model for the system described above. This revenue model illustrates how revenue is generated and shared among the key stakeholders in the lighting infrastructure. In general, application and/or application service providers collect revenue A from application users. Application owners or service providers pay a fee B to the Lighting Infrastructure Application Framework service provider. The LIAF service provider pays fees C to the lighting infrastructure owners.

Key stakeholders of the lighting infrastructure based applications include the owners of the lighting infrastructure. These are the entities that own the light-pole/fixture and the property on which the lighting infrastructure is located. Another key party involved with the system is the LIAF service provider. These are the entities that provide hardware and software platforms deployed to provide the data and services for the applications. The assignee herein is a service provider for the LIAF. Other important entities include the application developers and owners. These entities sell applications or application services. These applications and service providers are based on the data collected, processed and distributed by the LIAF.

Among the revenue sources for funding the LIAF are applications, application services and data. There are revenue options for application or application service providers. Users of an application or the application services, pay a license fee that is typically either time interval based or paid as a one-time license fee. This fee is based on different levels of usage, for example, standard, professional, and administrator. The usage fee also can be dependent on the type of data, e.g. raw or summarized, real-time vs. non real-time, access to historical data, based on data priced dynamically by demand, and on the location associated with data.

Another application service includes advertisers. These are businesses that want to advertise products or services to applications and application-service users. Such advertisers pay advertisement fees for each application or service.

With regard to data, application and application service developers make payments for accessing data. Data includes specific data, e.g. energy usage at a node, on a per light engine basis for the entire light, on a per light engine channel, or per sensor. Another type of data is the status of a light, e.g. administrative status such as temperature threshold or energy cost to trigger dimming, dimming percentage, reporting of light status including setting of detection interval and reporting interval. This data can also include operational status such as present status of light, on or off, dimmed and dimming amount, failed, abnormal, etc. Other types of data include environmental data, e.g. temperature, humidity and atmospheric pressure at the node; or lighting data such as ambient light and its color.

The nodes may also sense and provide numerous other types of data. For example, gases such as carbon dioxide, carbon monoxide, methane, natural gas, oxygen, propane, butane, ammonia, or hydrogen sulfide can be detected and data reported. Other types of data include accelerometer status indicating seismic events, intrusion detector status, Bluetooth® [1] MAC address, active RFID tag data, ISO-18000-7, and DASH 7 data. Below we describe some of these applications and the data they can collect in more detail.

Application specific sensor data can include an intrusion sensor to detect intrusion at the base of the pole or the light fixture, unauthorized opening of a cover at the base of pole, unauthorized opening of the light fixture, a vibration sensor for intrusion related vibration detection, earthquake related vibration detection or pole damage related vibration detection. A motion sensor can detect motion, its direction, and the type of motion detected.

Audio sensors can provide another type of collectable data. Audio sensors can detect glass breaking, gunshots, vehicle engines' on-or-off events, tire noise, vehicle doors closing, a human communication event, or a human distress noise event.

People detection sensors can detect a single person, multiple people, and count of people. Vehicle detection can include single vehicle, multiple vehicles, and the duration of sensor visibility. The vehicle detection can provide a vehicle count, or recognition information regarding make, model, color, license plate etc.

Our system can also provide data regarding correlated events, often by using data from multiple sensors. For example, sensor data from a motion detector, and a people detector can be combined to activate a lighting function to turn on, off, dim or brighten lights. A count of people with motion detection provides information about security, retail activity or traffic related events. Motion detection coupled with vehicle detection can be used to indicate a breach in security of a facility.

Use of combinations of sensors, such as motion and vehicle count or motion and audio, provides useful information for performing various actions. The time of data collection can also be combined with data from sensors such as those discussed above to provide useful information, e.g. motion detection during open and closed hours at a facility. Light level sensors coupled to motion detection sensors can provide information useful for lighting control. Motion detection can be combined with video to capture data only when an event occurs. Current and historical sensor data can be correlated and used to predict events or need for adjustment of control signals, e.g. traffic flow patterns.

Another use for data collected at the nodes is aggregation. This allows data events to be used to generate representative values for a group using a variety of techniques. For example, aggregated data can be used to collect information about luminaire types at a site (e.g. post-top and wall-pack luminaires); environmentally protected vs. unprotected luminaires; or luminaires outside exposed areas. Data can be collected based on light area (e.g. pathway, parking lot, driveway), facility type (e.g. manufacturing, R&D), corporate region (e.g. international vs. domestic), etc.

Power usage can be aggregated for fixture type, facility, facility type, or geographical region. Environment sensing related aggregation can be provided for geographical areas or facility types. Security applications include aggregations for geographical area or facility type. Traffic applications include aggregations by time-of-day, week, month, year or by geographical area (e.g. school area vs. retail area). Retail applications include aggregations by time of day, week, month, etc., as well as by geographical area or facility type. Data can also be filtered or aggregated based on user-specified criteria, e.g. time of day.

Custom application development allows users to specify data to be collected and forwarded to the custom applications and services; actions to be performed based on the data at the lighting nodes; the format of the data that will be forwarded to applications or application services; and management of historical data.

Our revenue distribution model allows for revenue sharing among lighting infrastructure owners, application infrastructure owners, and application or application service owners. Today, for infrastructure owners, lighting is a cost center involving capital investment, energy bills and maintenance costs. Here the assignee provides the hardware, software and network resources to enable applications and application services on a day-to-day basis, allowing the infrastructure owner to offset at least some of the capital, operational, and maintenance expenses.

Figure 7:
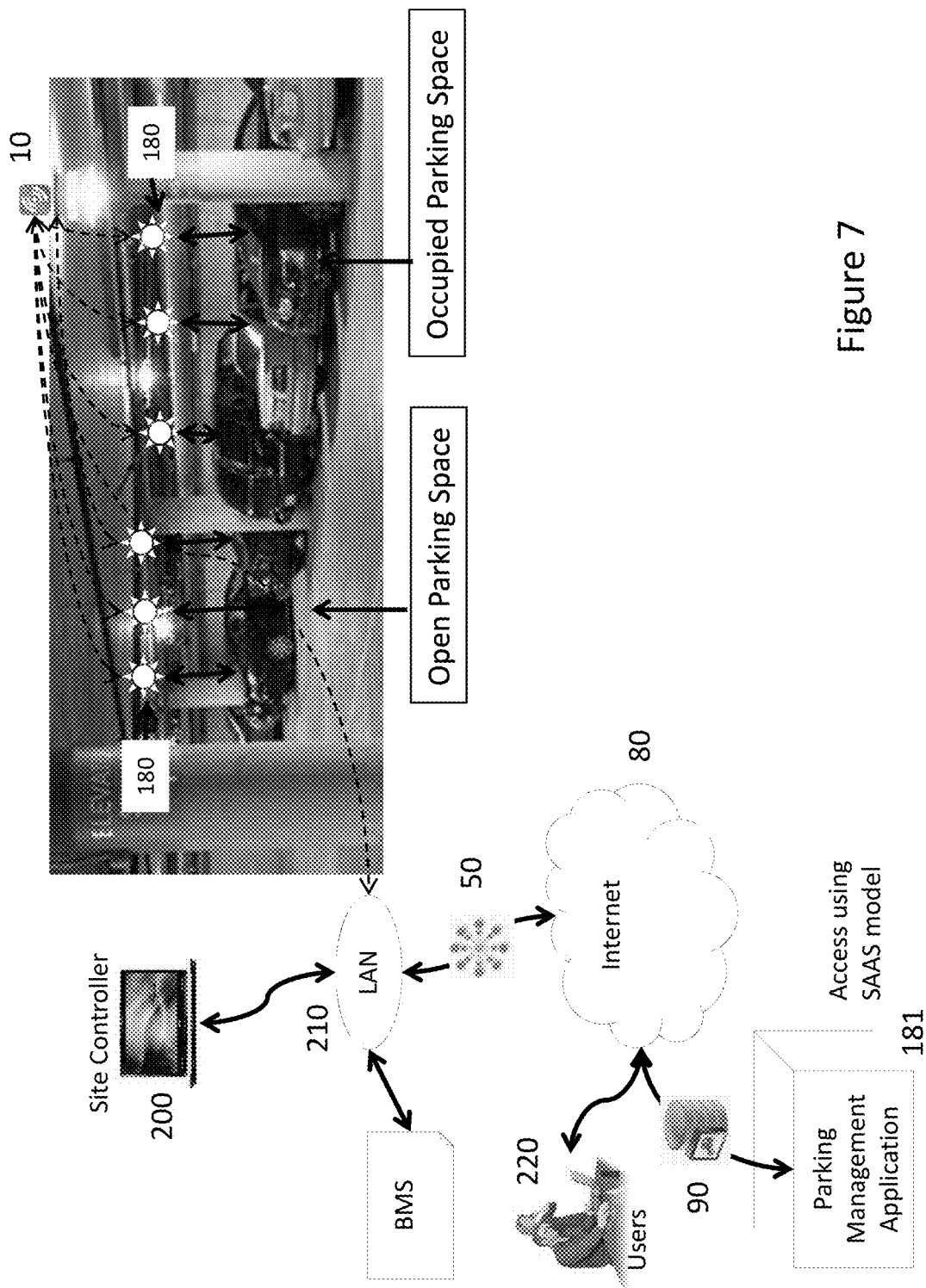
FIG. 7 illustrates a parking garage application for a networked lighting system.

FIGS. 7-10 illustrate four sample applications for the system described above. FIG. 7 illustrates a parking garage application. A series of vehicle detection sensors 180 are positioned one above each parking space in a parking garage, or a single multi-space occupancy detection sensor is positioned at each light. The sensors can operate using any well-known technology that detects the presence or absence of a vehicle parked underneath them. When a parking space specific sensor is deployed, then each sensor includes an LED that displays whether the space is open, occupied, or reserved. This enables a driver in the garage to locate open, available and reserved spaces. It also allows the garage owner to know when spaces are available without having to visually inspect the entire garage.

The sensors are coupled using wired or wireless technology to a Node Platform 10, such as described for the system above. The Node Platform 10 communicates to a Site Controller 200 via a Local Area Network (LAN) 210 and/or to a Service Platform 90 using the Gateway Platform 50. The Gateway Platform 50 is connected to the Service Platform 90 via the Internet 80 and to users 220. The Site Controller 200 can communicate with the Service Platform 90 or Parking Management Application 181. The Parking Management Application 181 enables users 220 to reserve spaces by accessing that application over the Internet 80.

Figure 8:
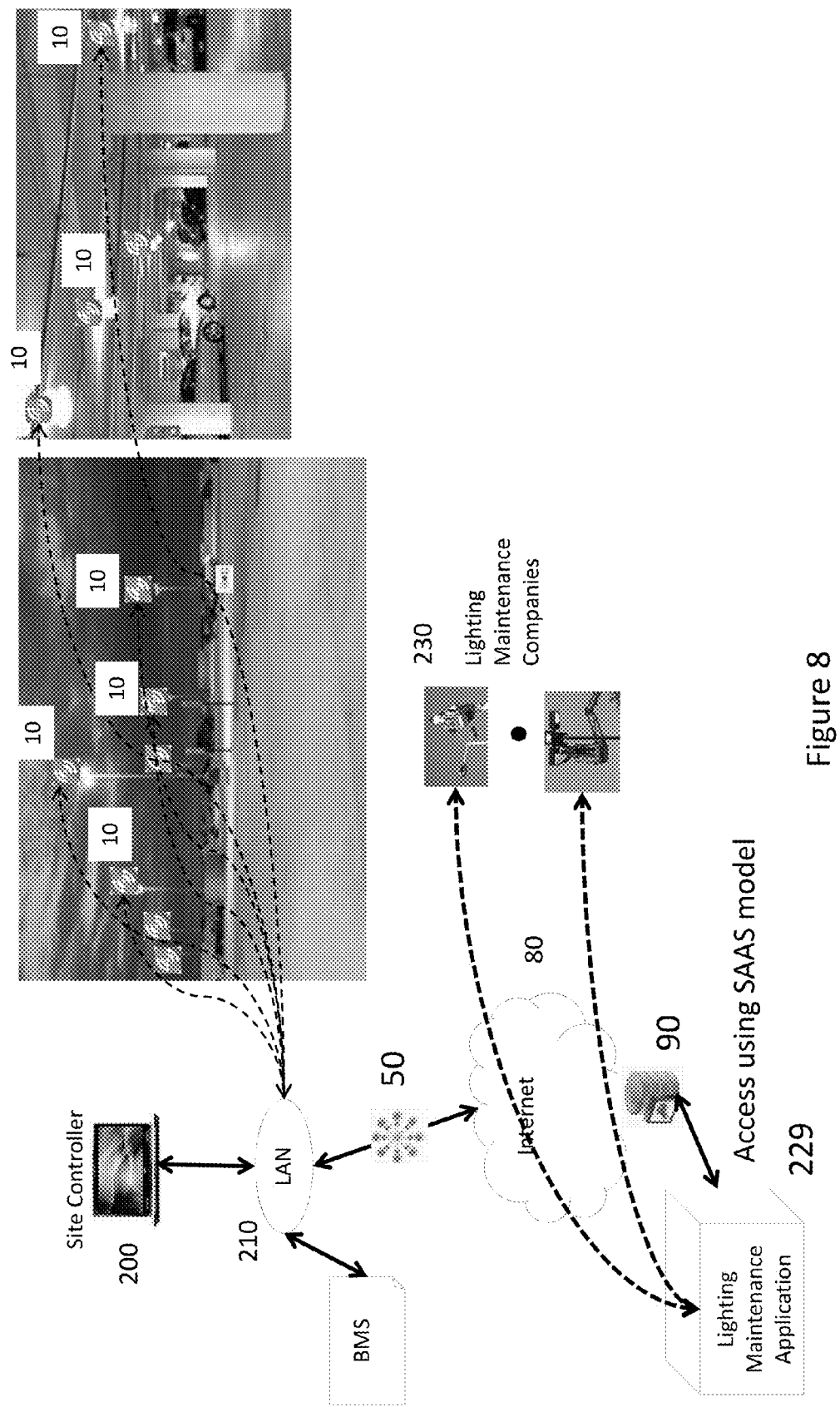
FIG. 8 illustrates a lighting maintenance application for a networked lighting system.

FIG. 8 illustrates a lighting maintenance application. In this application lighting nodes 10 are networked together using a system such as described above, and in turn coupled to a Site Controller 200. Using the technology described above, information about the lighting nodes, such as power consumption, operational status, on-off activity, and sensor activity are reported to the site controller 200 and/or to the Service Node 90. In addition, the site controller 200 and/or Service Node 90 can collect performance data such as temperature or current, as well as status data such as activities occurring at the nodes 10. Lighting Maintenance Application 229 that provides lighting maintenance related functions accesses raw maintenance data from the Service Node 90. Maintenance related data such as LED temperature, LED power consumption, LED failure, Network Failure and Power Supply failure can be accessed by a lighting maintenance company 230 from the Lighting Maintenance Application 229 to determine when service is required or other attention is needed.

Figure 9:
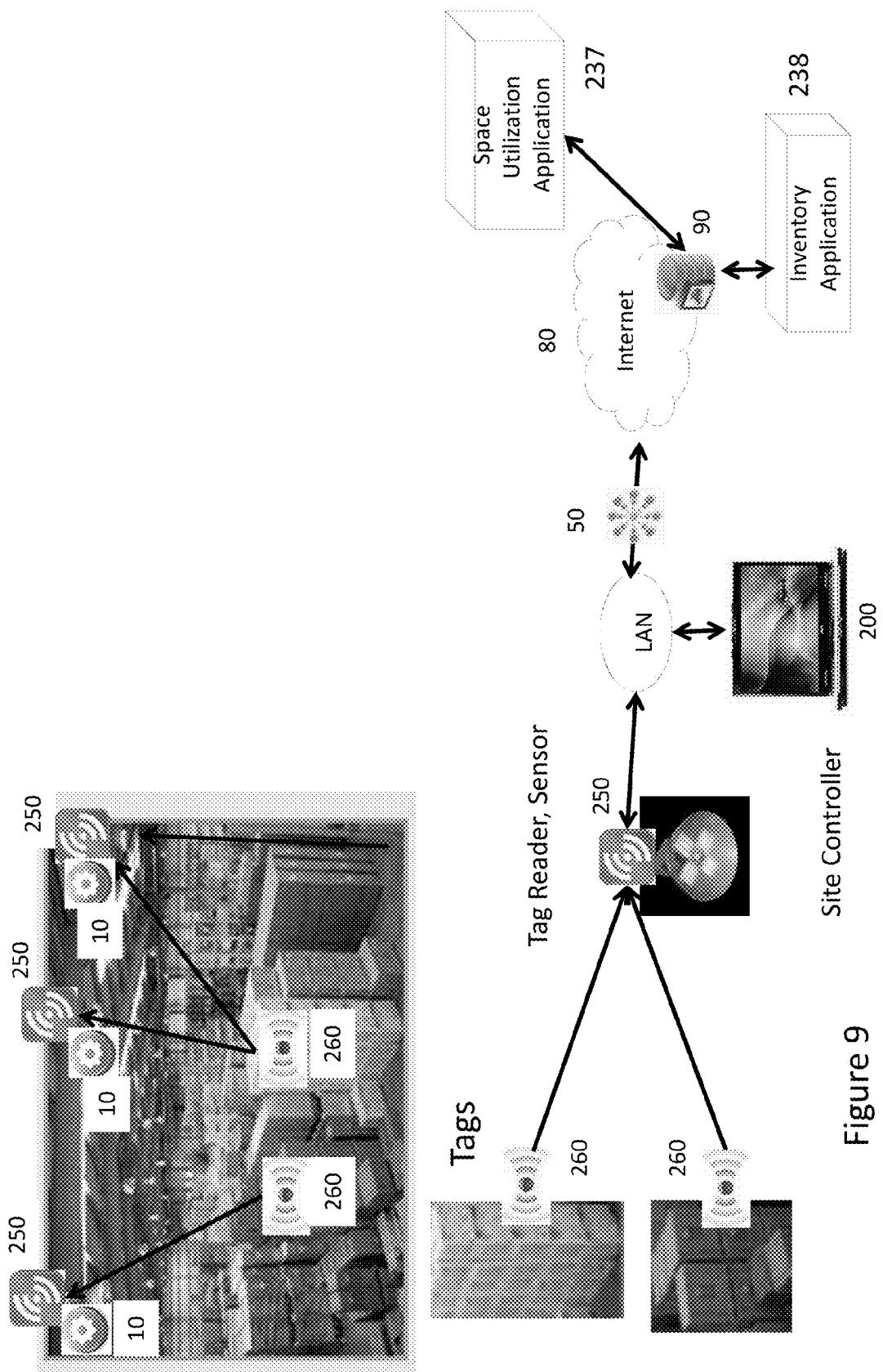
FIG. 9 illustrates a warehouse inventory application for a networked lighting system.

FIG. 9 illustrates a warehouse inventory application for the systems described above of our invention. As illustrated there, a series of RFID tag readers 250 are positioned throughout a warehouse along the Node Platform 10. These tag readers 250 detect the RFID tags 260 on various items in the warehouse. Using the network of Node Platforms 10 as described herein, the tag readers 250 can provide that information to a site controller 200 and/or Service Platform 90. The Tag Reader 250 collects location and identification information and uses Node Platform 10 to forward data to the Site Controller 200 and/or the Service Platform 90. This data is then forwarded to applications such as Inventory Application 238 from the Service Platform 90. The location and the identification data can be used to track goods traffic inside the warehouse. The same strategy can be used to monitor the warehouse space usage. The sensors detect the presence of items in the warehouse and the space occupied by these items. This space usage data is forwarded to the Site Controller 200 and/or the Service Platform 90. Applications monitoring and managing Space Utilization Application 237 will access this data from the Service Platform 90.

Figure 10:
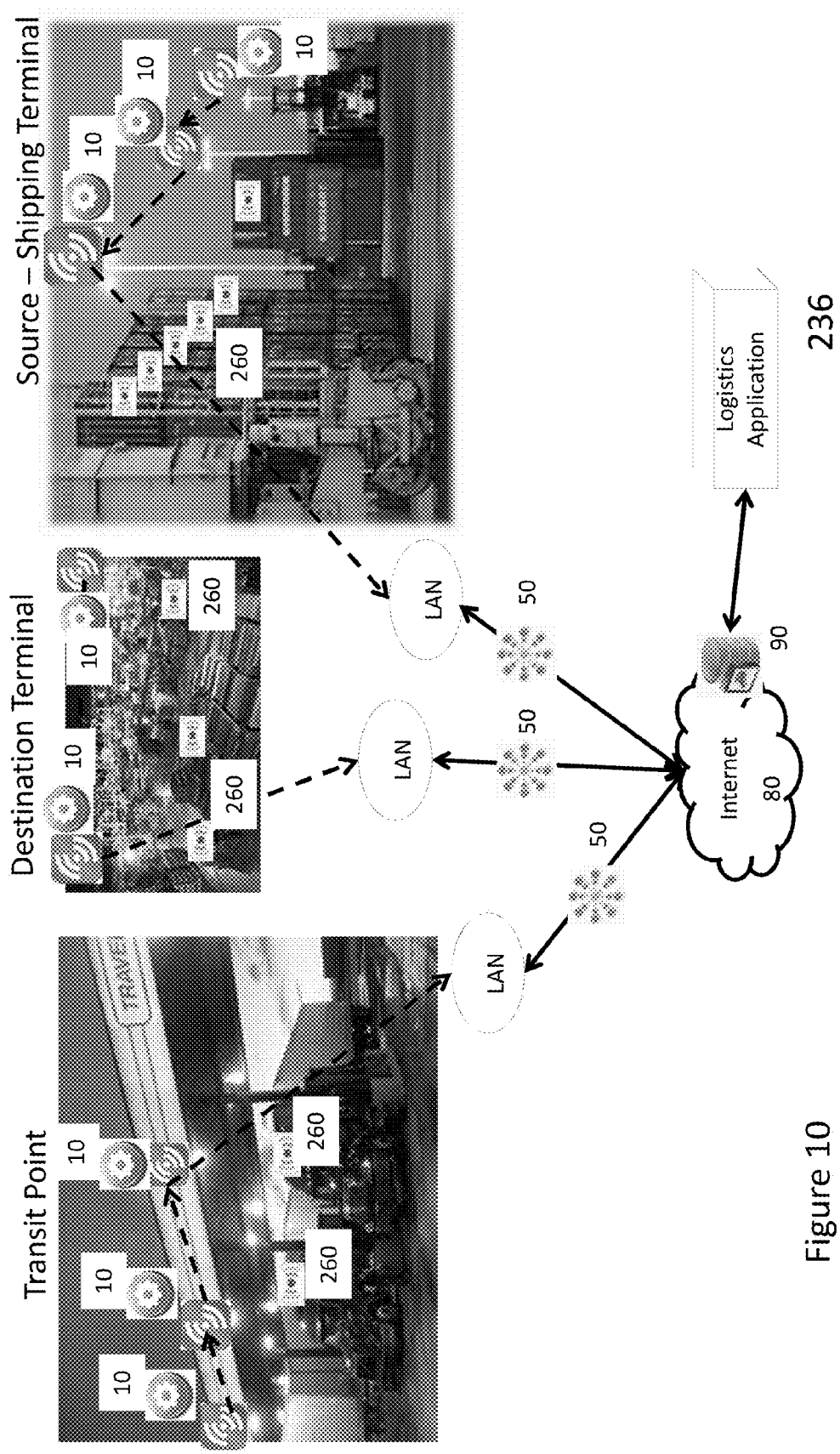
FIG. 10 illustrates an application of a networked lighting system for monitoring of a shipping terminal.

FIG. 10 illustrates another application of our system, i.e., monitoring a shipping terminal and tracking goods from the source to the destination which can be done using this system. In this case, RFID Tags 260 are positioned throughout the source for the goods (e.g., Shipping Port Terminal), transit (Weigh Station or Gas Stations) and destination (e.g., Warehouse) along with the Node Platform 10. Similarly, RFID Tags 260 are positioned on goods and vehicles transporting goods. These RFID Tags 260 transmit location, identification and other sensor data information using the Node Platform 10 to the Service Platform 90. This is done using the Gateway Platform 50 at each site (source, transit, destination). The Service Platform 90 makes this data available to applications such as Logistics Application 236, enabling users accessing the Logistics Application 236 to be able to get accurate location and goods status information.

Figure 11:
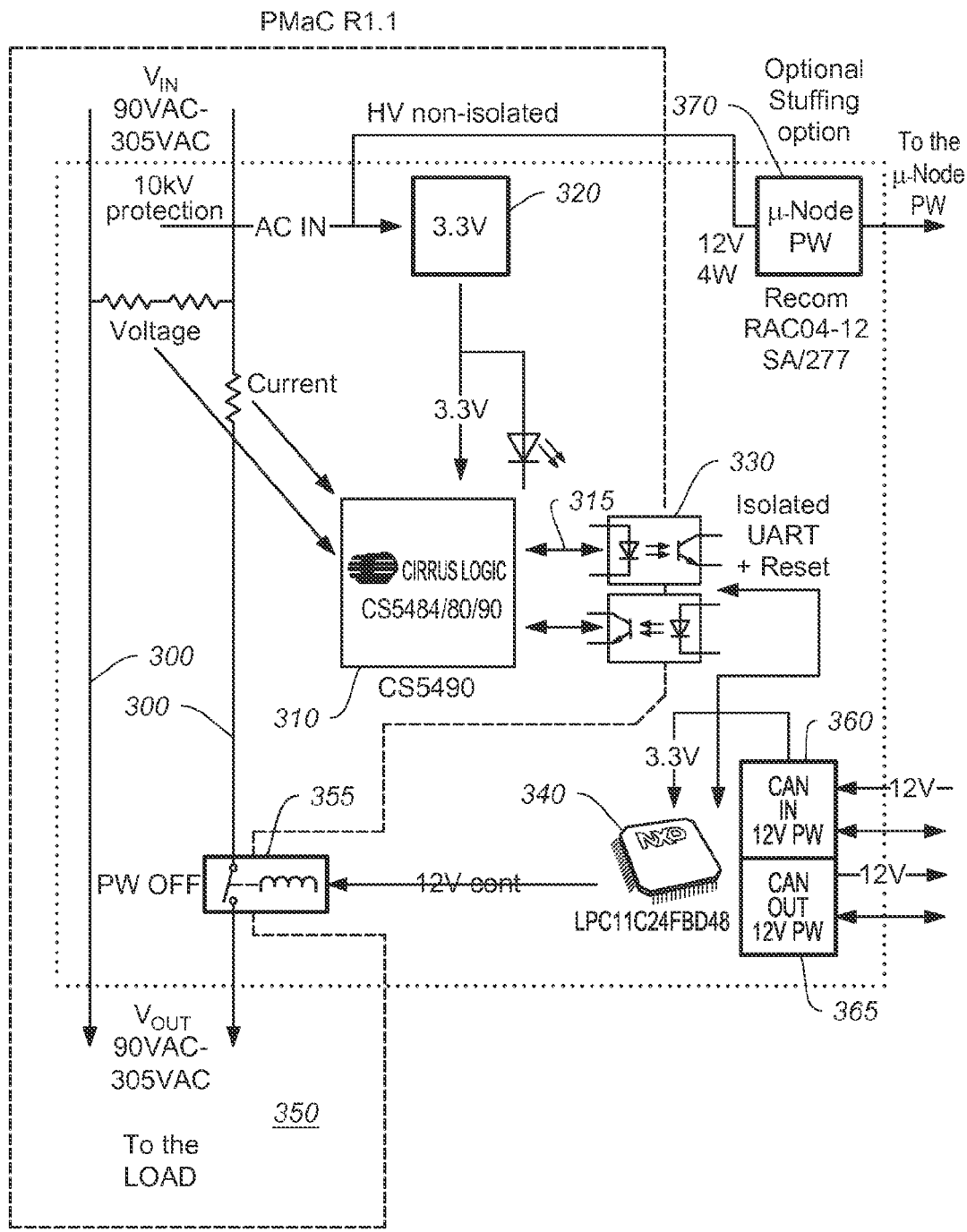
FIG. 11 is a block diagram illustrating the power monitoring and control circuitry at a node.

FIG. 11 is a block diagram of the electrical components for power monitoring and control within a node. The power measurement and control module illustrated measures incoming AC power, and controls the power provided to the AC/DC converter. It also provides for surge suppression and power to the node components.

This circuitry is used to control the power to the light-emitting diodes at an individual node. The actual count of input or outputs outlined below depends on customer application requirements. As shown in the diagram, AC power is provided via lines 300 at a voltage range between 90 and 305 volts. The voltage and current are sensed by an energy measurement integrated circuit 310. An AC-DC transformer 320 provides 3.3 volts to the circuit 310 to power the integrated circuit 310. In FIG. 11, the dashed lines represent the non-isolated portion of the high-voltage system. The dotted lines designate the portion of the circuit that is protected up to 10,000 volts.

Integrated circuit 310 is a CMOS power measurement device that measures the line voltage and current. It is able to calculate active, reactive, and apparent power, as well as RMS voltage and current. It provides output signals 315 to a "universal asynchronous receiver/transmitter" (UART) device 330. The UART device 330 translates data between parallel and serial interfaces. The UART 330 is connected to provide signals to a microcontroller 340 that controls the output voltage provided to the load 350, which is preferably the LED lighting system 350. This control is implemented using a switch 355.

Also coupled to the microcontroller 340 are devices 360 and 365 which implement a controller area network bus system, commonly referred to as a CAN bus. The CAN bus allows multiple microcontrollers to communicate with each other without relying upon a host computer. It provides a message-based protocol for communication. The CAN bus allows multiple nodes to be daisy chained together for communications among them.

Optionally provided on the circuit board is a power module 370. The power module 370 accepts AC power through its input terminals and provides controlled DC power at its output terminal. If desired, it can provide input power for some of the devices illustrated in FIG. 12, which is discussed next.

Figure 12:
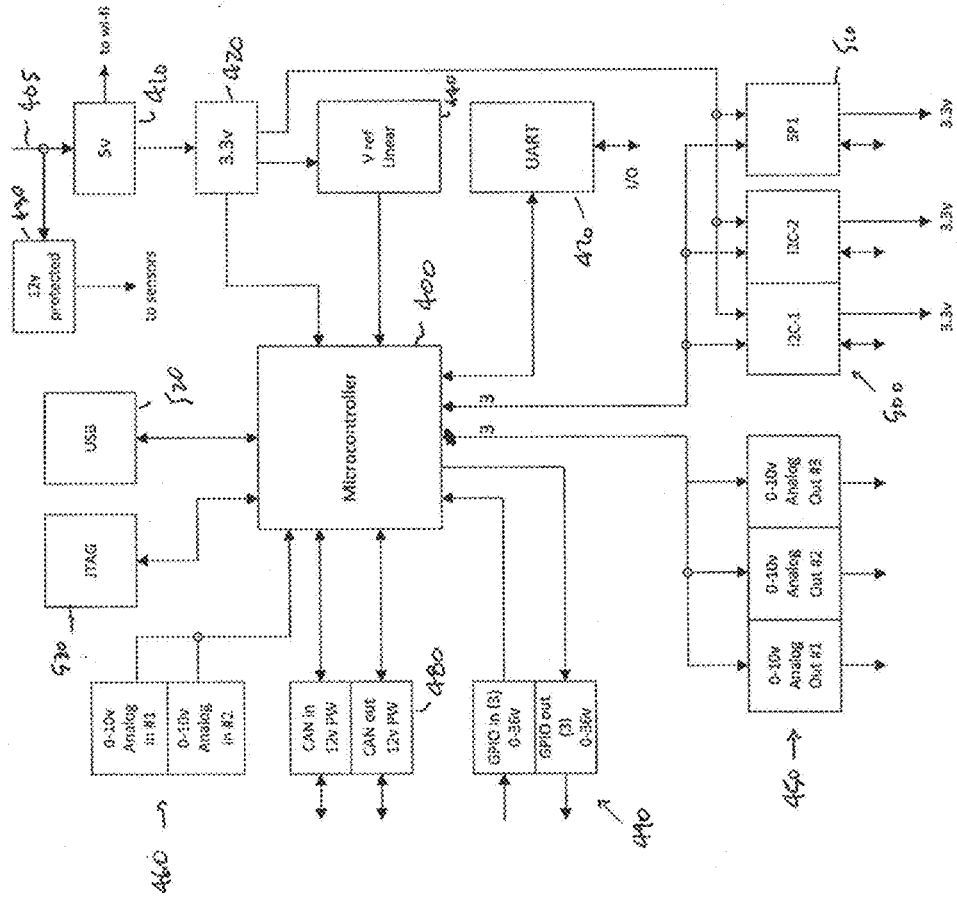
FIG. 12 is a block diagram illustrating the application controller at a node.

FIG. 12 is a block diagram of the application controller located at a node. The node provides for wireless communication with the application software. This application software enables control of the power, lighting, and sensors that are running on microcontroller 400. It also provides power to the various modules illustrated in the figure, and enables communication with the sensors.

The application controller in FIG. 12 operates under control of a microcontroller 400, which is depicted in the center of the diagram. Incoming electrical power 405, for example, supplied by module 370 in FIG. 11, is stepped down to 5 volts by transformer 410 to provide electrical power for Wi-Fi communications, and is also provided to a 3.3 volt transformer 420 which powers microcontroller 400. The power supply 430 also receives the input power and provides it to sensors (not shown). The 3.3 volt power is also provided to a reference voltage generator 440.

The microcontroller 400 provides a number of input and output terminals for communication with various devices. In particular, in the preferred embodiment, the microcontroller 400 is coupled to provide three 0 to 10 volt analog output signals 450, and to receive two 0 to 10 volt analog input signals 460. These input and output signals can be used to control, and to sense the condition of, various sensors. Communication with the microcontroller 400 is achieved by UART 470 and using the CAN bus 480. As explained with regard to FIG. 11, CAN bus 480 enables communication among microcontrollers without need of a host computer.

To enable future applications, and provide flexibility, microcontroller 400 also includes multiple general-purpose input/output pins 490. These accept or provide signals ranging from 0 to 36 volts. These are generic kittens whose behavior can be controlled or programmed through software. Having these additional control lines allows additional functionality enabled by software, without need of replacement of hardware.

Microcontroller 400 is also coupled to a pair of I2C bus interfaces 500. These bus interfaces can be used to connect other components on the board, or to connect other components that are linked via a cable. The I2C bus 500 does not require predefined bandwidth, yet enables multi-mastering, arbitration, and collision detection. Microcontroller 400 is also connected to an SP1 interface 510 to provide surge protection. In addition, microcontroller 400 is coupled to a USB interface 520, and to a JTAG interface 530. The various input and output busses and control signals enable the application controller at the node interface, comprising a wide variety of sensors and other devices, to provide, for example, lighting control and sensor management.

The preceding has been a detailed description of a networked lighting infrastructure for use with sensing applications. As described, the system provides unique capabilities for existing or future lighting infrastructure. Although numerous details have been provided with regard to the specific implementation of the system, it will be appreciated that the scope of the invention is defined by the appended claims.

APPENDIX TO THE SPECIFICATION

[1] The "Bluetooth" word mark and logos are registered trademarks owned by Bluetooth SIG, Inc. Other trademarks and trade names are those of their respective owners.

What is claimed is:

1. A gateway node platform for a network of lighting systems comprising a plurality of node platforms at least some of which represent lighting nodes, the plurality of node platforms in communication with a service platform through the gateway node platform, the service platform is associated with multiple applications, comprising:
a power input terminal for receiving electrical power;
a network interface for allowing communication with the plurality of node platforms via a local area network (LAN) and with the service platform via a wide area network (WAN), the network interface including a media module for receiving media data;
a memory device for storing instructions; and
a processor coupled to the power input terminal and the network interface, the processor, which, when executing the instructions, causes the system to perform operations comprising:
performing analytics data processing related to the media data in response to the media data received by the media module;
producing analytics data related to the media data; and
transmitting the analytics data to the service platform via the WAN for utilization by at least one of the multiple applications associated with the service platform.

2. The gateway node of claim 1, further comprising:
a sensor; and
a housing within which each of the power input terminal, the processor, the network interface and the sensor is disposed, wherein the housing is adapted to be retrofitted into a street light in place of an existing illumination source in the street light.

3. The gateway node platform of claim 1,
further comprising a sensor for detecting a condition at the gateway node platform, the sensor representing a device for detecting at least one of audio, video, motion, light, and weather.

4. The gateway node platform of claim 1, further comprising a sensor for detecting a condition at the gateway node platform, the sensor representing an image capture device that produces the media data.

5. The gateway node platform of claim 1,
further comprising a controller coupled to the processor;
wherein the processor, which, when executing the instructions, causes the system to perform operations comprising:
receiving a sensor signal related to a condition detected by at least one of the plurality of node platforms;
processing information from the sensor signal related to the condition detected by at least one of the plurality of node platforms;
providing the controller a control signal to perform an action related the condition detected by at least one of the plurality of node platforms.

6. The gateway node platform of claim 5,
further comprising a light source coupled to the power input terminal; and
wherein providing the controller a control signal to perform an action related the condition detected by at least one of the plurality of node platforms further comprising:

providing the control signal to control illumination from the light source.

7. The gateway node platform of claim 5, wherein providing the controller the control signal to perform the action related the condition detected by at least one of the plurality of node platforms further comprises:
providing the control signal to perform an action related to the control of at least one of an irrigation system, a gate, and a lighting source.

8. The gateway node platform of claim 5, wherein providing the controller the control signal to perform an action related the condition detected by at least one of the plurality of node platforms further comprises:
providing the control signal to perform an action related to the control of at least one of management of power distribution for a power system and measurement and monitoring of power for the power system.

9. The gateway node platform of claim 1, wherein performing analytics data processing related to the media data in response to the media data received by the media module comprises:
performing at least one of analysing, detecting, recording and reporting application specific events.

10. The gateway node platform of claim 1, wherein the network interface is communicatively coupled to the plurality of node platforms along a control plane to enable communications among the plurality of node platforms related to at least one of events, usage, and node status.

11. The gateway node platform of claim 1, wherein the network interface is communicatively coupled to a select group of the plurality of node platforms along a data plane to enable an exchange of the media data representing high bandwidth local traffic among the select group of the plurality of node platforms.

12. A method performed by a gateway node platform in a lighting infrastructure application framework (LIAF), the LIAF including the gateway node platform, a plurality of node platforms and a service platform associated with multiple applications, comprising:
receiving via the local area network (LAN) or from a sensor in communication with the gateway node platform, sensor information processed at the individual node platforms by executing application functions associated with the multiple applications, the sensor information including information about conditions detected the nodes, the sensor information including media data;
performing analytics data processing, using a processor of a machine, related to the media data;
producing analytics data related to the media data; and
transmitting via the wide area network (WAN) to the service platform, the analytics data for utilization by at least one of the multiple applications associated with the service platform.

13. The method of claim 12, further comprising:
transmitting via the wide area network (WAN), to the service platform, the sensor information processed at the individual nodes such that the multiple applications can utilize the sensor information processed at the individual nodes;
receiving via the WAN, from the service platform, instructions associated with the multiple applications to be executed by the individual nodes, the instructions related to the transmitted sensor information processed at the individual nodes; and
transmitting via the LAN, the instructions received from the service platform to the individual node platforms.

14. The method of claim 12,
wherein the instructions includes a first set of instructions associated with a first application and a second set of instructions associated with a second application;
wherein transmitting via the LAN, the instructions received from the service platform to the individual node platforms further comprises:
transmitting the first set of instructions to a first group of the individual node platforms; and
transmitting the second set of instructions to a second group of the individual node platforms such that instructions from the first application and instructions from the second application are executed concurrently by the plurality of node platforms.

15. The method of claim 12, wherein the first set of nodes and the second set of nodes include at least one same node.

16. The method of claim 12, wherein performing analytics data processing, using a processor of a machine, related to the media data further comprises performing at least one of analysing, detecting, recording and reporting application specific events.

17. The method of claim 12, wherein each of the multiple applications associated with the service platform performs operations related to the conditions detected by sensors at the individual nodes based on information provided by the gateway node platform from the individual nodes.

18. The method of claim 12, wherein the transmitted sensor information processed at the individual nodes is further processed by the service platform for utilization by at least one of the multiple applications.

19. The method of claim 12, wherein individual nodes from the plurality of node platforms are enabled to perform a variety of application functions to support the multiple applications.

20. The method of claim 12, wherein the sensor represents an image capture device that produces the media data.

* * * * *